United States Patent
Manduca et al.

(10) Patent No.: US 6,329,819 B1
(45) Date of Patent: Dec. 11, 2001

(54) AUTOCORRECTION OF MR IMAGES FOR MOTION ARTIFACTS

(75) Inventors: Armando Manduca; Richard L. Ehman, both of Rochester, MN (US)

(73) Assignee: Mayo Foundation For Medical Education and Research, Rochester, MN (US)

( * ) Notice: Subject to any disclaimer, the term of this patent is extended or adjusted under 35 U.S.C. 154(b) by 0 days.

(21) Appl. No.: 09/673,489
(22) PCT Filed: Apr. 14, 1999
(86) PCT No.: PCT/US99/08123
§ 371 Date: Oct. 16, 2000
§ 102(e) Date: Oct. 16, 2000
(87) PCT Pub. No.: WO99/53444
PCT Pub. Date: Oct. 21, 1999

Related U.S. Application Data

(60) Provisional application No. 60/081,864, filed on Apr. 15, 1998, and provisional application No. 60/109,488, filed on Nov. 23, 1998.

(51) Int. Cl.[7] .................................................... G01V 3/00
(52) U.S. Cl. ........................ 324/309; 324/307; 324/300
(58) Field of Search .................................... 324/309, 307, 324/300, 311, 312

(56) References Cited

U.S. PATENT DOCUMENTS 5,055,789 * 10/1991 Kondo et al. ..................... 324/309
5,311,132   5/1994 Noll et al. ......................... 324/309

FOREIGN PATENT DOCUMENTS

WO 98/01828   1/1998 (WO).

OTHER PUBLICATIONS

PCT Search Report dated Jul. 30, 1999 in PCT International Appln. No. PCT/US99/08123.

Tanaka, Eiichi, "Intelligent Iterative Image Reconstruction with Automatic Noise Suppression," 1990 IEEE Nuclear Science Symposium Conference Record, Arlington, VA, Oct. 22–27, 1990, pp. 1480–1486.

* cited by examiner

Primary Examiner—Hezron Williams
Assistant Examiner—Brij B. Shrivastav
(74) Attorney, Agent, or Firm—Quarles & Brady, LLP

(57) ABSTRACT

An MRI image is corrected for motion artifacts using an iterative, autocorrection process in which corrections are tried and the quality of the resulting reconstructed image is measured. Metrics based on the gradient of the reconstructed image are employed to measure image quality.

12 Claims, 2 Drawing Sheets

AUTOCORRECTION OF MR IMAGES FOR MOTION ARTIFACTS

This application is based upon PCT International Appln. No. PCT/US99/08123, filed Apr. 14, 1999 and Provisional Patent Applications Serial Nos. 60/081,864 and 60/109,488 filed on Apr. 15, 1998 and Nov. 23, 1998, respectively.

BACKGROUND OF THE INVENTION

The field of the invention is nuclear magnetic resonance imaging methods and systems. More particularly, the invention relates to the correction of motion artifacts in MR images.

When a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, $M_z$, may be rotated, or "tipped", into the x-y plane to produce a net transverse magnetic moment $M_t$. A signal is emitted by the excited spins after the excitation signal $B_1$ is terminated, this signal may be received and processed to form an image.

When utilizing these signals to produce images, magnetic field gradients ($G_x$, $G_y$ and $G_z$) are employed. Typically, the region to be imaged is scanned by a sequence of measurement cycles in which these gradients vary according to the particular localization method being used. The resulting set of received NMR signals are digitized and processed to reconstruct the image using one of many well known reconstruction techniques.

Object motion during the acquisition of NMR image data produces both blurring and "ghosts" in the phase-encoded direction. Ghosts are particularly apparent when the motion is periodic, or nearly so. For most physiological motion each view of the NMR signal is acquired in a period short enough that the object may be considered stationary during the acquisition window. In such case the blurring and ghosting is due to the inconsistent appearance of the object from view to view. Motion that changes the appearance between views such as that produced by a patient moving, by the respiration or the cardiac cycle, or by peristalsis, is referred to hereinafter as "view-to-view motion". Motion may also change the amplitude and phase of the NMR signal as it evolves during the pulse sequence and such motion is referred to hereinafter as "in-view motion".

Both blurring and ghosting can be reduced if the data acquisition is synchronized with the functional cycle of the object to reduce view-to-view motion. This method is known as gated NMR scanning, and its objective is to acquire NMR data at the same point during successive functional cycles so that the object "looks" the same in each view. The drawback of gating is that NMR data may be acquired only during a small fraction of the object's functional cycle, and even when the shortest acceptable pulse sequence is employed, the gating technique can significantly lengthen the data acquisition.

Another proposed method for eliminating ghost artifacts is disclosed in U.S. Pat. No. 4,567,893, issued on Feb. 4, 1986. This prior patent teaches that the distance in the image between the ghosts and the object being imaged is maximized when the NMR pulse sequence repetition time is an odd multiple of one-fourth of the duration of the periodic signal variation. This can be used to alleviate ghosts due to respiratory motion. While this method, indeed, improves image quality, it does impose a constraint on the NMR pulse sequence repetition time and it often results in a longer total scan time. It also assumes that the motion is periodic.

Yet another method for reducing the undesirable effects due to periodic signal variations is disclosed in U.S. Pat. No. 4,706,026 issued on Nov. 10, 1987 and entitled "A Method For Reducing Image Artifacts Due To Periodic Variations In NMR Imaging." In one embodiment of this method, an assumption is made about the signal variation period (e.g. due, for example, to patient respiration) and the view order is altered from the usual monotonically increasing phase-encoding gradient to a preselected order. For a given signal variation period, a view order is chosen so as to make the NMR signal variation as a function of the phase-encoding amplitude be at a desired frequency. In one embodiment, the view order is selected such that the variation period appears to be equal to the total NMR scan time (low frequency) so that the ghost artifacts are brought as close to the object being imaged as possible. In another embodiment (high frequency), the view order is chosen to make the variation period appear to be as short as possible so as to push the ghost artifacts as far from the object as possible.

This prior method is effective in reducing artifacts, and is in some respects ideal if the variation is rather regular and at a known frequency. On the other hand, the method is not very robust if the assumption made about the motion temporal period does not hold (e.g., because the patient's breathing pattern changes or is irregular). If this occurs, the method loses some of its effectiveness because the focusing of the ghosts, either as close to the object or as far from the object as possible, becomes blurred. A solution to this problem is disclosed in U.S. Pat. No. 4,663,591 which is entitled "A Method For Reducing Image Artifacts Due To Periodic Signal Variations in NMR Imaging." In this method, the non-monotonic view order is determined as the scan is executed and is responsive to changes in the period so as to produce a desired relationship (low frequency or high frequency) between the signal variations and the gradient parameter. The effectiveness of this method, of course, depends upon the accuracy of the means used to sense the patient motion, and particularly, any variations in the periodicity of that motion.

Yet another method for reducing motion artifacts in NMR images is referred to in the art as "gradient moment nulling". This method requires the addition of gradient pulses to the pulse sequence which cancel, or null, the effect on the NMR signal phase caused by spins moving in the gradients employed for position encoding. Such a solution is disclosed, for example, in U.S. Pat. No. 4,731,583 entitled "Method For Reduction of NMR Image Artifacts Due To Flowing Nuclei By Gradient Moment Nulling".

The most successful method for correcting MR images for motion artifacts employs navigator signals acquired during the scan. As described in U.S. Pat. No. 4,937,526, such navigator signals are acquired periodically during the scan, and the information in these signals may be used to correct the image data for patient motion. Unfortunately, acquisition of the navigator signals increases the scan time.

More recently, an automatic correction method has been proposed by D. Atkinson et al., "Information Processing in Medical Imaging", P.341–354, 1997 in which the entropy of the reconstructed image is examined as a focus criterion by which to iteratively adjust motion estimate. This prior method, due to the properties of entropy, works mostly by making dark areas as dark as possible (thus removing ghosting), but does not use much information from the bright areas of the image. While this method works well on simple test images, clinical MR images often do not become as sharp as they should be and the processing time may be very long.

SUMMARY OF THE INVENTION

The present invention relates to improvements in the autocorrection approach which make it a practical tool for the correction of clinical images. The first is the development of a much better cost function (i.e., quality measure or metric) for the image, based on calculating the entropy or normalized variance of the gradient of the MR image rather than the entropy of the MR image itself as has been done in the past. The present invention uses information from the whole image and drives the image towards areas of uniform brightness separated by edges which are as sharp as possible. This is a good model for what is expected of clinical MR images of the body in ideal situations. The present invention greatly improves autocorrection performance, and correlates much more closely than image entropy with what radiologists expect to see in a quality image.

The second aspect of the invention arises from considering cases in which the motion is primarily along a single dimension—e.g., shoulder images, in which patient motion is primarily up-down. In such cases, the calculations can be greatly simplified, and it becomes possible to evaluate some lines of the reconstructed image without performing the calculations necessary to correct and evaluate the rest of the image. In clinical shoulder images, for example, very good corrections are possible by evaluating only 32 columns rather than all 256 columns in an image saving a factor of 8 in computing time. This also provides a mechanism for speeding up the autocorrection of more complicated motions by separating them—i.e., correcting in one direction for a while, then in another, then the first again—and using the above technique to speed up each such set of calculations.

Yet another aspect of the invention is the method employed to systematically estimate the phase errors caused by motion during sampling of k-space. Rather than iteratively estimating the phase error for each acquired view, k-space is divided into blocks of views selected according to this time order in which they are acquired, and these blocks are each iteratively phase adjusted until the optimal image is produced. The block size is then reduced and the process is repeated by adjusting the phase of each block until the optimal image is again achieved. This process repeats until the block size has been reduced to a minimum size. The autocorrection process converges rapidly to the best image possible.

A general object of the invention is to improve the clinical quality of MRI images without increasing scan time. By using a cost function based on the gradient of the image, autocorrection produces an image which is clinically improved. The method can be used on any image which was acquired as a series of views during which patient motion may have occurred. No further data need be acquired.

Another object of the invention is to reduce the time needed to converge on an optimal image using the autocorrection technique. This is accomplished in part by focusing the autocorrection in a specific region of the image which is of prime clinical interest, or limiting the correction to phase errors due to motion in a specific direction.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

Figure 1:
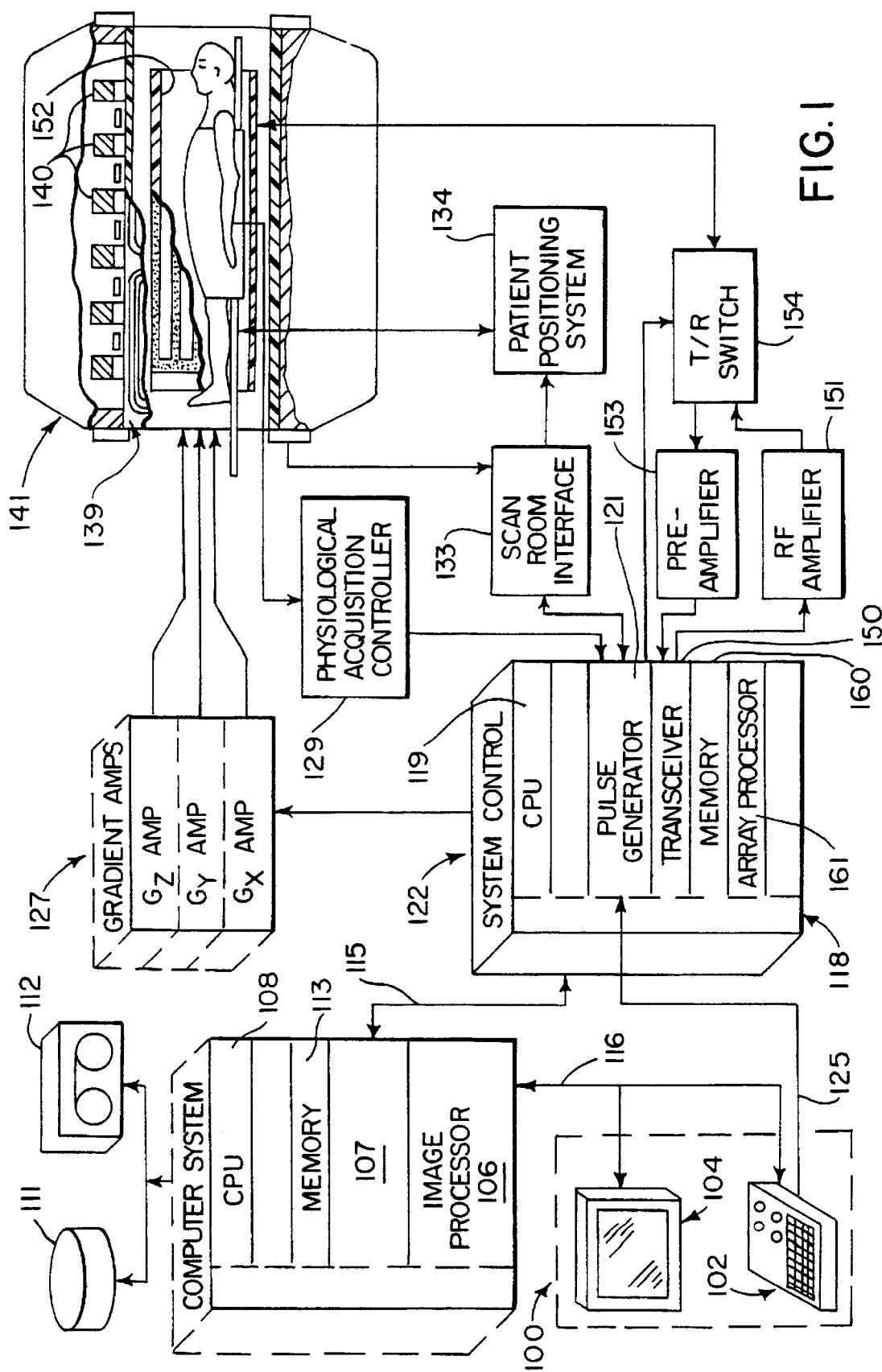
FIG. 1 is a block diagram of an MRI system which employs the present invention.

Data corruption due to global translational patient motion during the scan does not actually lose information. If the motion is known, and the appropriate phase corrections applied, the image can be perfectly restored. Rotational motion, while it can lose information, usually does not do so significantly. It is therefore possible in principle to correct for motion given only the raw data from the MR scanner by simply trying corrections for different possible assumed notions and searching for the highest quality resulting image with a suitable evaluation function.

We have developed a method, which We term "autocorrection". Autocorrection is fundamentally different from prior methods in that it does not attempt to track patient motion (as do navigator echoes), nor does it seek information about the motion explicitly in the k-space data, as do some phase retrieval techniques. Rather, autocorrection performs motion correction by defining a measure or metric of image quality, and evaluating many combinations of possible patient motions, searching for a set which optimizes this quality after the corresponding corrections,are made to the image. This is admittedly a computationally intensive process, and only the recent advent of high power processors makes such an approach feasible.

The motion is assumed to be inter-view, so that each line, or view, of k-space has an associated displacement, representing the position of the patient at the time the view was acquired. The set of these displacement values of all views is the motion history. The autocorrection method iteratively adjusts an estimate of the motion history, starting from an initial estimate of zero motion. For each estimate, the lines of k-space are corrected for the assumed motion by the appropriate phase shifts, the data is transformed to the image domain, and the quality of the image is evaluated. The estimate of patient motion is gradually refined to optimize the image quality. It is assumed that the metric has an optimal value if the object is stationary, and that any motion during the imaging sequence will corrupt the image and degrade this value. In other words, it is assumed that it is impossible to make an image better (both in terms of the metric and of visual quality) because of patient motion during the scan, and that the better the value of the metric, the better the visual quality of the image.

In mathematical terms, autocorrection casts motion correction as an optimization problem, with the metric as the cost function, in a very high-dimensional space of possible motion corrections (as many dimensions as there are views in the acquired data). It is very difficult to find the true global minimum of such a cost function. However, in practice, it is possible to search the space of possible solutions in a way which often yields very good improvements in image quality in a reasonable amount of time.

The autocorrection method iteratively adjusts an estimate of the motion history (the relative motion at the time each view was acquired), starting from an initial estimate of zero motion, and trying corrections for different possible motion histories and searching for the highest quality resulting image. As noted above, this is optimization in a very high dimensional space, since each view (typically 256) has its own associated relative motion. We have considered a wide variety of possible approaches to this optimization problem, and have settled on a multi-resolution technique as being the most robust.

The preferred method begins with the acquired k-space data, and initially groups views in blocks of 64 selected according to their order of acquisition. A given block is "corrected for" a trial motion by applying the appropriate phase shifts, as if the patient had in fact moved by that amount during the acquisition of those views. The phase correction for motion of $\Delta y$ (in pixels) for view $k_j$, is simply a rotation of each element of that view by $\Delta\phi=2\pi k_j \Delta y_j$. The corrected data is transformed to image space and the metric is calculated. This metric is compared to the results for other trial motions and the optimal motion correction for that block of views is determined. We currently use golden section optimization and find the optimal motion to an accuracy of 0.02 pixel. This is most commonly done starting on one side of the center of k-space and working alternately outward, although other strategies may be used.

When corrections are complete for the blocks of 64 views, the process is begun again with blocks of 32, views and so on until individual views are considered one at a time. This procedure allows one to gradually approximate the motion history more and more accurately as one moves to smaller block sizes. It is not critical to start with a block size of 64 (any large number is fine), and, perhaps surprisingly, it is not always necessary to go all the way to correcting views individually. If one stops at blocks of 2 or even 4 views, the correction is often essentially complete—one has already captured the major features of the motion record, and the finer details are not critical.

The success of the autocorrection method depends upon the appropriate choice of an image quality metric. A good metric for autocorrection must not only show appropriate improvement as blurring and ghosting are reduced but, more importantly, must correlate well with an expert observer's opinion of image quality. We have developed new metrics based on the gradient of the image. One of these is the entropy of the gradient of the image. This quantity is minimized when the image consists of areas of uniform brightness, separated by sharp edges, since in such a case, the gradient is zero everywhere except at the edges, where it has high values. This is a fairly good model for what is expected in MR images of the body in ideal situations. Any blurring or ghosting will increase the entropy of the gradient, since the gradient will be non-zero at more points and will take on smaller values at the actual edge location. One phase-encoding preferred cost function, or metric ($F_1$) applies a one-dimensional gradient operator along the direction and then calculates the entropy of this gradient.

$$F_1 = -\sum_{ij} h_{ij} \log_2[h_{i,j}] \quad (1)$$

where:

$$-h_{i,j} = \sum_{ij} \left( \frac{\left| \begin{bmatrix} 1 \\ -1 \end{bmatrix} * g_{i,j} \right|}{\sum_{ij} \left| \begin{bmatrix} 1 \\ -1 \end{bmatrix} * g_{i,j} \right|} \right) \quad (2)$$

$g_{ij}$ = value at image pixel located at row $i$ and column $j$.

Another preferred metric is the normalized variance of the gradient of the image which also yields very good results. In this case the one-dimensional gradient operator $g_{ij}$ is applied, the result normalized and then squared in accordance with the cost function $F_2$:

$$F_2 = \sum_{ij} \left( \frac{\left\| \begin{bmatrix} 1 \\ -1 \end{bmatrix} * g_{ij} \right\|}{\sum_{ij} \left| \begin{bmatrix} 1 \\ -1 \end{bmatrix} * g_{i,j} \right|} \right)^2 \quad (3)$$

DESCRIPTION OF THE PREFERRED EMBODIMENT

Referring first to FIG. 1, there is shown the major components of a preferred MRI system which incorporates the present invention. The operation of the system is controlled from an operator console 100 which includes a keyboard and control panel 102 and a display 104. The console 100 communicates through a link 116 with a separate computer system 107 that enables an operator to control the production and display of images on the screen 104. The computer system 107 includes a number of modules which communicate with each other through a backplane. These include an image processor module 106, a CPU module 108 and a memory module 113, known in the art as a frame buffer for storing image data arrays. The computer system 107 is linked to a disk storage 111 and a tape drive 112 for storage of image data and programs, and it communicates with a separate system control 122 through a high speed serial link 115.

The system control 122 includes a set of modules connected together by a backplane. These include a CPU module 119 and a pulse generator module 121 which connects to the operator console 100 through a serial link 125. It is through this link 125 that the system control 122 receives commands from the operator which indicate the scan sequence that is to be performed. The pulse generator module 121 operates the system components to carry out the desired scan sequence. It produces data which indicates the timing, strength and shape of the RF pulses which are to be produced, and the timing of and length of the data acquisition window. The pulse generator module 121 connects to a set of gradient amplifiers 127, to indicate the timing and shape of the gradient pulses to be produced during the scan. The pulse generator module 121 also receives patient data from a physiological acquisition controller 129 that receives signals from a number of different sensors connected to the patient, such as ECG signals from electrodes or respiratory signals from a bellows. And finally, the pulse generator module 121 connects to a scan room interface circuit 133 which receives signals from various sensors associated with the condition of the patient and the magnet system. It is also through the scan room interface circuit 133 that a patient positioning system 134 receives commands to move the patient to the desired position for the scan.

The gradient waveforms produced by the pulse generator module 121 are applied to a gradient amplifier system 127 comprised of $G_x$, $G_y$ and $G_z$, amplifiers. Each gradient amplifier excites a corresponding gradient coil in an assembly generally designated 139 to produce the magnetic field gradients used for position encoding acquired signals. The gradient coil assembly 139 forms part of a magnet assembly 141 which includes a polarizing magnet 140 and a whole-body RF coil 152 a transceiver module 150 in the system control 122 produces pulses which are amplified by an RF amplifier 151 and coupled to the RF coil 152 by a transmit/receive switch 154. The resulting signals radiated by the excited nuclei in the patient may be sensed by the same RF coil 152 and coupled through the transmit/receive switch 154 to a preamplifier 153. The amplified NMR signals are demodulated, filtered, and digitized in the receiver section of the transceiver 150. The transmit/receive switch 154 is controlled by a signal from the pulse generator module 121 to electrically connect the RF amplifier 151 to the coil 152 during the transmit mode and to connect the preamplifier 153 during the receive mode. The transmit/receive switch 154 also enables a separate RF coil (for example, a head coil or surface coil) to be used in either the transmit or receive mode.

The NMR signals picked up by the RF coil 152 are digitized by the transceiver module 150 and transferred to a memory module 160 in the system control 122. When the scan is completed and an entire array of data has been acquired in the memory module 160, an array processor 161 operates to Fourier transform the data into an array of image data. This image data is conveyed through the serial link 115 to the computer system 107 where it is stored in the disk memory 111. In response to commands received from the operator console 100, this image data may be archived on the tape drive 112, or it may be further processed by the image processor 106 and conveyed to the operator console 100 and presented on the display 104.

For a more detailed description of the transceiver 150, reference is made to U.S. Pat. Nos. 4,952,877 and 4,992,736 which are incorporated herein by reference.

Figure 2:
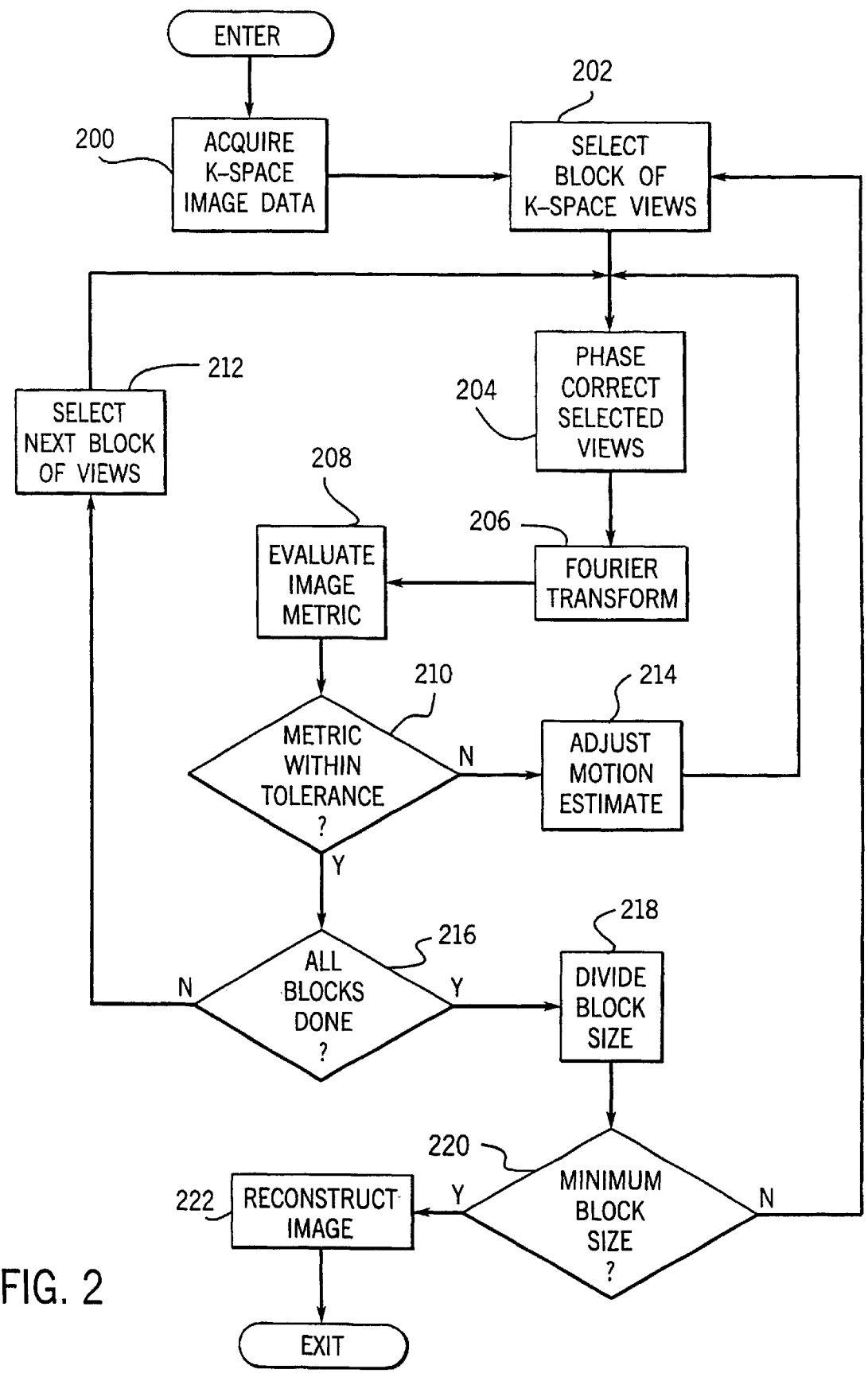
FIG. 2 is a flow chart of the preferred autocorrection method employed by the MRI system of FIG. 1.

The autocorrection method is employed to reduce image artifacts in k-space image data sets acquired with the MRI system of FIG. 1. Referring particularly to FIG. 2, after a k-space image data set is acquired as indicated at process block 200, an initial block of k-space views is selected for correction as indicated at process block 202. In the preferred embodiment 64 views are selected in this initial block. The views in this block are then phase shifted as indicated at process block 204 based on an initial motion estimate.

The altered k-space data set is then Fourier transformed as indicated at process block 206 to produce an image. As indicated at process block 208, the image metric is then calculated using this reconstructed image and the entropy of the gradient metric $F_1$ described above.

If the calculated metric $F_1$ is within a preset tolerance as determined at decision block 210, the block of 64 views has been corrected and the next block of 64 views is selected as indicated at process block 212 and the process repeats. Otherwise, the motion estimate for this block is adjusted at process block 214 and the process is repeated to evaluate the image metric with the corresponding adjusted phase shift.

All blocks of k-space views are separately adjusted in phase starting at the center of k-space and working outward. When the last block has been corrected as determined at decision block 216, the block size is reduced in size as indicated at process block 218 and the system branches back to process block 202 to repeat the steps on the smaller block size. The process is repeated and the block size is reduced until the minimum block size has been processed as determined at decision block 220. In the preferred embodiment block size is divided by two after each iteration, and the minimum block size is one view. The corrected k-space data set is then Fourier transformed to reconstruct an optimal image as indicated at process block 222.

It should be apparent that the autocorrection method can be employed on one, two or three axes of motion. In many clinical applications of the method, it has been discovered that processing only a single axis of motion is necessary. This reduces the processing time considerably. For example, if the motion is primarily along the phase encoding direction, a one dimensional FFT along the readout gradient direction can be performed once on the acquired k-space image data set before the autocorrection method is applied. The phase corrections in process 204 are made on this hybrid-space data set and the Fourier transform in process 206 can be a one-dimensional FFT along the phase encoding gradient direction.

Also, in many clinical applications only a small portion of the reconstructed image is clinically important. The autocorrection method may be modified in this situation to evaluate the image metric in process block 208 only in the selected region of interest. That is, the operator identifies the pixels in the region of interest and the image metric is calculated only on these pixels. This reduces processing time and in some cases improves the resulting image in the critical region. This also enables the correction of images in which the motion is different in different regions of the image. In such cases each region may be separately corrected using the autocorrection method. Simple, non-global motions of this type can be corrected, for example, in MR angiography where the motions are not complex.

For example, the complete image many contain 256 columns of pixels which must be Fourier transformed each time the metric is to be calculated. If the region selected by the operator extends over only 64 columns of pixels, then only those 64 columns need be Fourier transformed during each evaluation iteration. This reduces the processing time by a factor of four.

Original images were randomly selected from a navigator study data set described by McGee, et al., *Radiology* 205, p.341–354, 1997. These images were autocorrected with both the 1-D and the 2-D methods (the 1-D used 64 columns spanning the humeral head). The computation times were about 30 minutes for the 2-D and 8 minutes for the 1-D methods. The original images, the autocorrected images, and the navigator-corrected images were printed onto film and evaluated by four radiologists. For each image, the radiologists were asked to rate the degree of improvement over the original image for the 1-D, 2-D and navigator corrected images separately. The results are shown in Table 1. The 1-D autocorrection method performs nearly as well as the 2-D method, and they both significantly improve the image quality (although not as much as the navigator corrected images which actually attempt to measure the motion).

TABLE 1

Average Observer Ratings for Correction Techniques

| Observer | 1-D Auto-correction | 2-D Auto-correction | Navigator Echoes |
| --- | --- | --- | --- |
| Radiologist #1 | 0.77 | 0.75 | 0.91 |
| Radiologist #2 | 0.86 | 0.93 | 1.32 |
| Radiologist #3 | 0.52 | 0.52 | 0.77 |
| Radiologist #4 | 0.64 | 0.59 | 0.82 |
| Average | 0.70 | 0.70 | 0.95 |

Table 1. Average improvements for each technique on 25 shoulder images, on a scale of:
−1 = degradation,
0 = no change,
1 = visible improvements,
2 = dramatic improvement.

The autocorrection method of the present invention has been shown to be a practical technique for motion correction in a demanding clinical application. The method presented here uses only the raw (complex) data from the MRI system, requires only a few minutes of processing time, and significantly reduces motion artifacts, performing nearly as well as the navigator echo technique, but without increasing scan time. The method can also be applied retroactively to previously acquired data sets, whether acquired with or without any of the other artifact reduction methods described above. It is applicable to both 2-D and 3-D translational and rotational motion and the corrections can be made one axis at a time as described above.

The present invention can also be used to correct other MR errors. For example, errors caused by gradient non-idealities in echo-planar imaging (EPI) acquisitions, or saturation variations due to variations in TR when imaging using cardiac gating can be corrected.

The method may also be used in other imaging modalities in which a plurality of views, or projections, are acquired over a period of time and used to reconstruct an image, such as electron beam or x-ray CT. These views, or projections can be adjusted and the result on image quality evaluated and optimized in the same manner described above for MR images.

The present invention also enables the autocorrections to be applied locally rather than globally to the entire image. Thus, local regions in the image can be separately corrected to further reduce processing time and tailor the correction to the particular motion in that region.

What is claimed is:

1. A method for correcting a medical image for artifacts, the steps comprising:
   a) acquiring a series of views to form an image data set;
   b) reconstructing an image from the acquired image data set;
   c) calculating a gradient image from the reconstructed image;
   d) evaluating the quality of the reconstructed image by calculating a cost function based on the gradient image;
   e) iteratively minimizing the cost function by making corrections to views in the image data set and repeating steps b), c), d) and e).

2. The method as recited in claim 1 in which the series of views are acquired on an MRI system and the image is reconstructed by performing a Fourier transformation.

3. The method as recited in claim 1 in which the artifacts are caused by patient motion.

4. The method as recited in claim 1 which includes selecting a region in the image which is to be corrected and performing steps c), d) and e) on the selected region.

5. The method as recited in claim 4 in which only a portion of the image containing said selected region is reconstructed in step b).

6. The method as recited in claim 4 which includes selecting a second region in the image which is to be corrected and performing steps c), d) and e) on the second region.

7. The method as recited in claim 1 in which the cost function is calculated as the entropy of the gradient.

8. The method as recited in claim 1 in which a cost function ($F_1$) is calculated as follows:

$$F_1 = -\sum_{ij} h_{ij} \log_2[h_{i,j}]$$

where $$-h_{i,j} = \sum_{ij} \left( \frac{\left| \begin{bmatrix} 1 \\ -1 \end{bmatrix} * g_{i,j} \right|}{\sum_{ij} \left| \begin{bmatrix} 1 \\ -1 \end{bmatrix} * g_{i,j} \right|} \right) \quad (2)$$

$g_{ij}$ = value at image pixel located at row $i$ and column $j$.

9. The method as recited in claim 1 in which the cost function is calculated as the normalized variance of the gradient.

10. The method as recited in claim 1 in which a cost function ($F_2$) is calculated as follows:

$$F_2 = \sum_{ij} \left( \frac{\left| \begin{bmatrix} 1 \\ -1 \end{bmatrix} * g_{i,j} \right|}{\sum_{ij} \left| \begin{bmatrix} 1 \\ -1 \end{bmatrix} * g_{i,j} \right|} \right) \quad (2)$$

$g_{ij}$ = value at image pixel located at row $i$ and column $j$.

11. The method as recited in claim 1 in which the cost function is iteratively minimized in step e) by:
   i) making corrections to each of a plurality of blocks of views and repeating steps b), c) and d) until the cost function is minimized for each block;
   ii) reducing the number of views in each block and repeating step i); and
   iii) repeating step ii) until the number of views in the block reaches a minimum.

12. The method as recited in claim 8 in which the minimum is one view per block.

* * * * *